United States Patent [19]
Kameno et al.

[11] Patent Number: 5,056,963
[45] Date of Patent: Oct. 15, 1991

[54] TIP FOR A CUTTING TOOL

[75] Inventors: Ryoki Kameno; Yasuhito Tomochika; Takao Tamagawa; Yoshiki Fujimoto, all of Osaka, Japan

[73] Assignee: Koyo Seiko Co., Ltd., Osaka, Japan

[21] Appl. No.: 492,411

[22] Filed: Mar. 9, 1990

Related U.S. Application Data

[63] Continuation-in-part of Ser. No. 315,510, Feb. 27, 1989, abandoned.

[30] Foreign Application Priority Data

Mar. 7, 1988 [JP] Japan ............................ 63-30514[U]

[51] Int. Cl.$^5$ .................... B23B 27/00; B24B 39/00
[52] U.S. Cl. .................................... 407/1; 407/113; 29/90.01
[58] Field of Search ............... 407/1, 48, 103, 113, 407/114; 29/90.01

[56] References Cited

U.S. PATENT DOCUMENTS

| | | | |
|---|---|---|---|
| 2,164,572 | 7/1939 | Christman | 407/1 |
| 3,137,059 | 6/1964 | Hertel | 407/113 |
| 3,279,035 | 10/1966 | Johnson | 407/113 |
| 3,839,772 | 10/1974 | Shimomura et al. | 407/48 |
| 3,925,868 | 12/1975 | Singh | 407/103 |
| 3,946,475 | 3/1976 | Hopkins | 407/48 |
| 3,947,937 | 4/1976 | Hertel | 407/114 |
| 3,975,809 | 8/1976 | Sorice et al. | 407/114 |
| 4,087,192 | 5/1978 | Hertel | 407/114 |
| 4,318,318 | 3/1982 | Schott | 407/113 |
| 4,441,841 | 4/1984 | Mori | 407/114 |
| 4,583,886 | 4/1986 | Drescher | 407/48 |
| 4,616,963 | 10/1986 | Habert et al. | 407/114 |
| 4,659,264 | 4/1987 | Friedline | 407/113 |
| 4,679,968 | 7/1987 | Tsujimura et al. | 407/113 |
| 4,681,487 | 7/1987 | Petterson | 407/114 |

FOREIGN PATENT DOCUMENTS 51-120486 10/1976 Japan.
58-143196 9/1983 Japan.

Primary Examiner—William E. Terrell
Attorney, Agent, or Firm—Wenderoth, Lind & Ponack

[57] ABSTRACT

A tip for a cutting tool which can apply a heavy residual stress in compression to a material to be cut. This tip has four cutting portions. Each of the cutting portions has first and second rake surfaces having first and second angles of negative values, respectively, relative to an upper surface of the tip. Absolute value of the first negative angle is smaller than that of the second negative angle. The second rake surface is located further from a center of the tip than is the first rake surface, and is also located behind the first rake surface relative to a cutting direction of the tip.

2 Claims, 4 Drawing Sheets

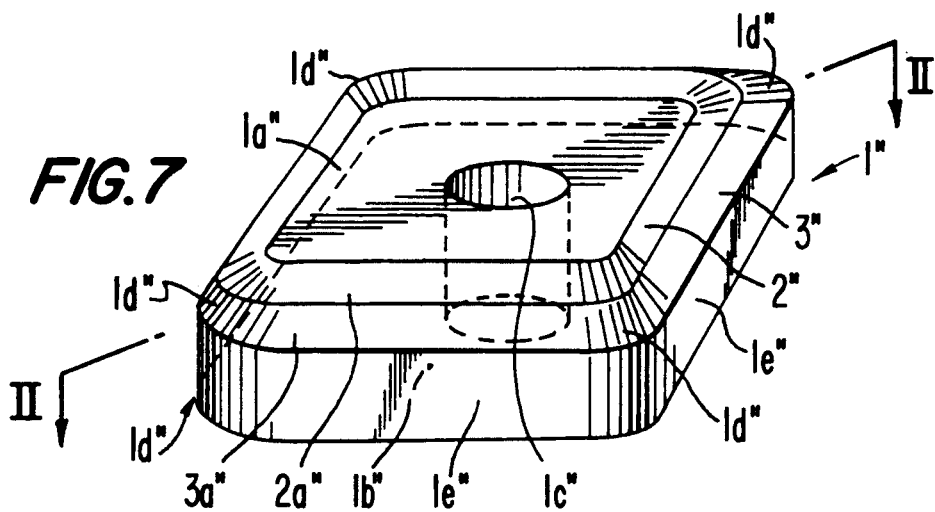
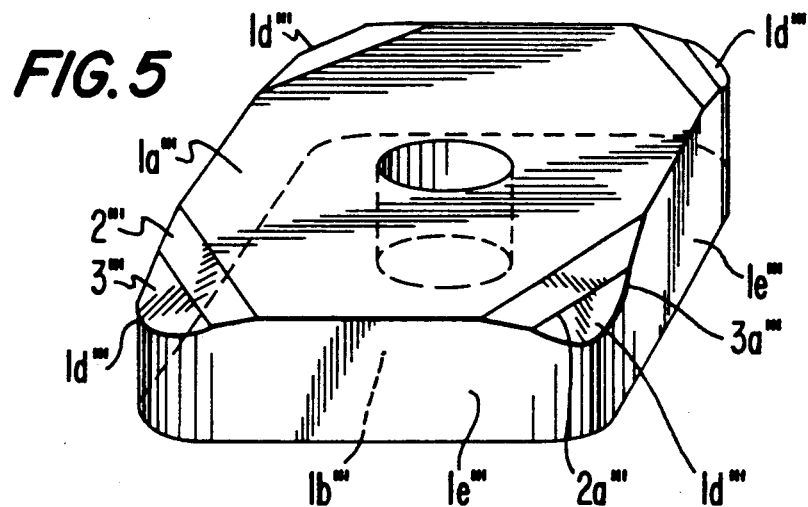
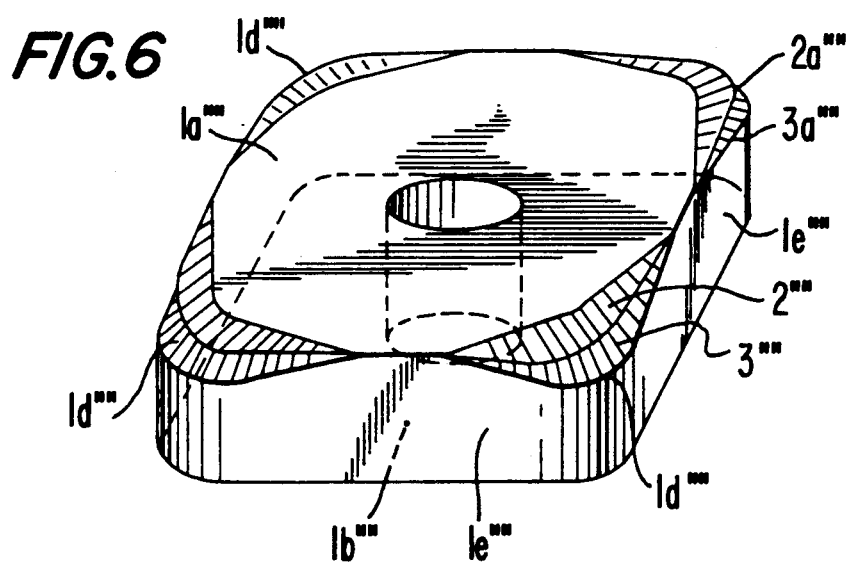

TIP FOR A CUTTING TOOL

This application is a continuation-in-part of now abandoned application Ser. No. 07/315,510 filed on Feb. 27, 1989.

BACKGROUND OF THE INVENTION

The present invention relates to a tip for a cutting tool which cuts and planes a surface of a piece such as a race surface of a bearing which is in a rolling contact with rolling elements.

Generally, a member which has a surface which is in a rolling contact with rolling elements is treated with heat for the purpose of extending the life-time of the member against rolling fatigue. Such heat treatment is applied to the whole member or only to its surface which is brought into a rolling contact with the rolling elements. After such heat treatment, the surface to be in contact with the rolling elements is cut away so that residual stress in compression is applied to the cut portion, for the purpose of further extending the life-time of the member against rolling fatigue. The presence of the residual stress in compression especially in the vicinity of the surface is very effective in extending the life.

A tip of a conventional type for a cutting tool is shown in FIG. 4. The tip has a rake surface S of an angle of negative value $\theta 1$ at a cutting portion thereof. That is, the rake surface S has a negative slope with respect to a cutting direction of the tip as shown by an arrow. A corner defined by the rake surface S and a front flank F is rounded.

The above prior art tip, however, cannot apply sufficient amount of residual stress of compression to the vicinity of the surface of a piece or material to be cut, because of the shape as described above, and what is worse, the residual stress present at the surface is apt to be of tension. The residual stress in tension affects the life-time of the material against rolling fatigue. Therefore, in that case, the portion where the residual stress in tension is present must be abraded to be removed. In other words, with the prior art tip, stress of compression sufficient to extend the life-time of the material against the rolling fatigue cannot be applied.

SUMMARY OF THE INVENTION

A primary object of this invention is to provide a tip for a cutting tool which can apply sufficient residual stress of compression to a surface of a piece or material to a sufficient depth.

In order to accomplish the above object, a tip for a cutting tool of the present invention is characterized in that a cutting portion thereof has at least adjacent first and second rake surfaces having first and second angles of negative values, respectively, relative to an upper surface of the tip, absolute value of the first negative angle being smaller than that of the second negative angle, and the second rake surface being located farther from a center of the tip than the first rake surface and in back of the first rake surface relative to a cutting direction of the tip.

The tip operates as follows. The tip cuts material to a predetermined depth by the cutting portion. In this cutting operation, the first rake surface having the first negative angle of a smaller absolute value effects a cutting operation and the second surface having the second negative angle of a greater absolute value burnishes the surface of the material after the cutting by the first rake surface. Accordingly, the tip of the present invention can give the material a much heavier residual stress of compression and in addition, the residual stress of compression is caused to be present at a greater depth from the surface of the material, as compared with the prior art tip.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 5 is a perspective view of a tip for a cutting tool according to a third embodiment of the present invention;

FIG. 6 is a perspective view of a tip for a cutting tool according to a fourth embodiment of the present invention; and FIG. 7 is a perspective view of a tip for a cutting tool according to a fifth embodiment of the present invention.

DETAILED DESCRIPTION OF PREFERRED EMBODIMENTS

Figure 1A:
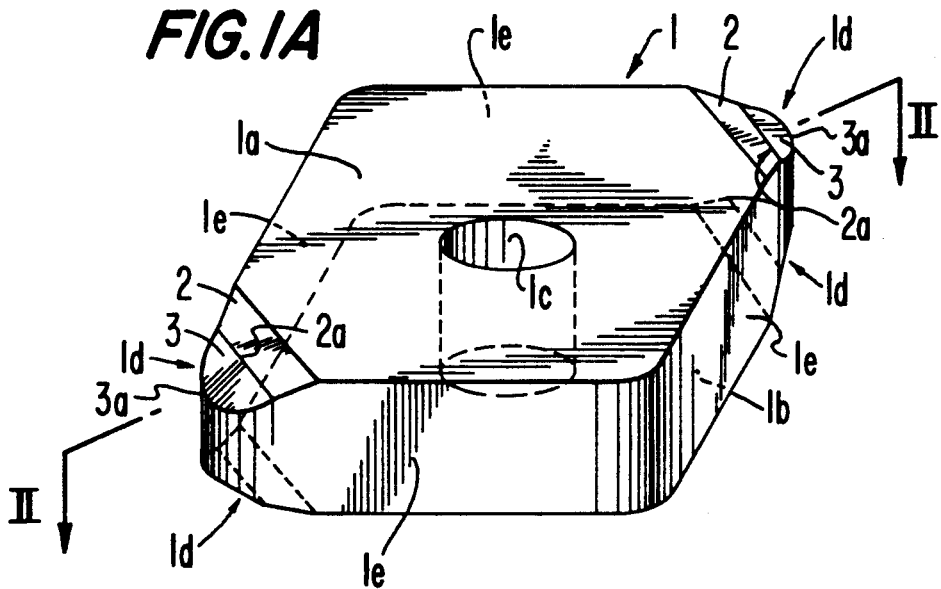
FIG. 1A is a perspective view of a tip for a cutting tool according to a first embodiment of the present invention.
Figure 2:
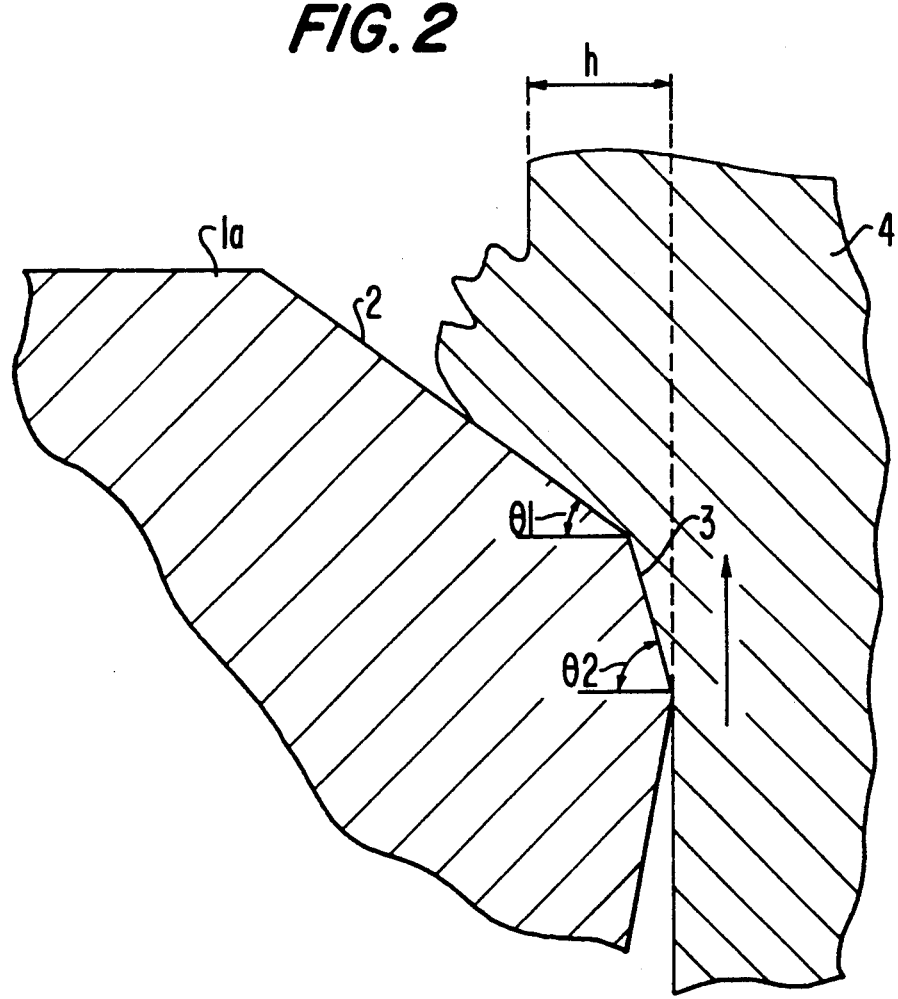
FIG. 2 is a part of a sectional view taken on line II—II of FIG. 1, showing the tip in the cutting operation.

FIG. 1A shows a tip 1 for a cutting tool according to a first embodiment the present invention. The tip 1 has a generally diamond shape with upper and lower quadrilateral faces 1a and 1b parallel to each other, sidewalls 1e connecting the upper and lower faces, and a hole 1c used to fix itself to a cutting tool (not shown) at a central portion thereof. The tip 1 has four cutting portions 1d, 1d, . . . on upper and lower portions of two corners between sides which meet at a sharp angle. As shown in FIG. 2, each of the cutting portions 1d has a first rake surface 2 having a first negative angle $\theta 1$, a second rake surface 3 having a second negative angle $\theta 2$ relative to the upper and lower surfaces, a first edge 2a defined by a junction between the first 2 and second 3 rake surfaces and a second edge 3a defined by a junction between the second surface 3 and the sidewalls 1e of the tip. Also, the upper quadrilateral face and the first rake surface intersect at an edge extending along the upper peripheral junction between the upper face 1a and the sidewalls of the cutting tip. In this embodiment the edges 2a and 3a form straight lines. Absolute value of the first negative angle $\theta 1$ is smaller than that of the second negative angle $\theta 2$. In other words, the first and second rake surfaces 2 and 3 each have a slope of negative value relative to a cutting direction of the tip 1, and the slope of the first rake surface 2 is more gentle than that of the second rake surface 3. In this embodiment, the absolute value of the first angle $\theta 1$ is 33° and that of the second angle θ2 is 78°. Cutting of a piece or material 4 with this tip 1 is carried out in the direction of an arrow in the figure. FIG. 2 shows that the depth of cut is "h".

Figure 1B:
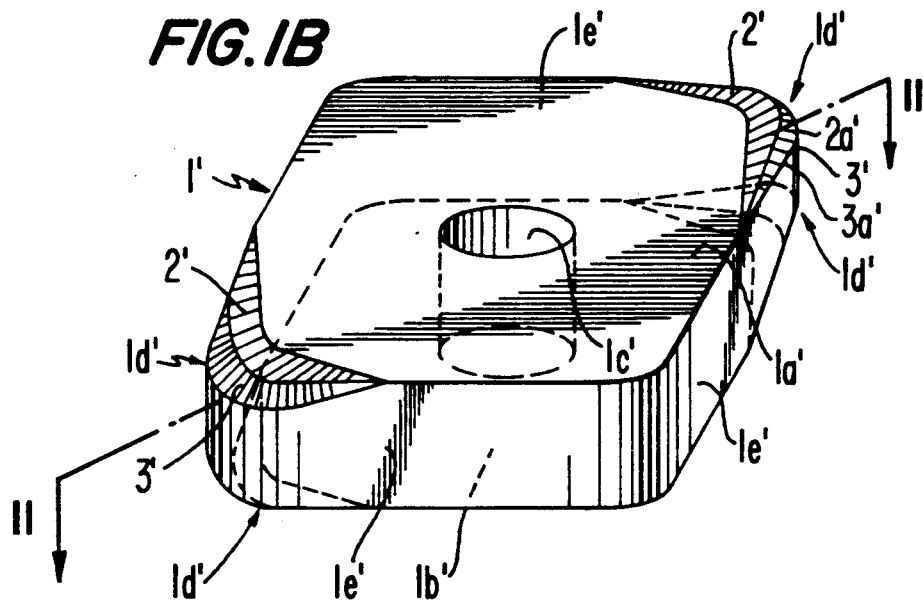
FIG. 1B is a perspective view of a tip for a cutting tool according to a second embodiment of the present invention.

FIG. 1B shows a second embodiment in which portions of the cutting tip 1' which correspond to portions of the first embodiment are indicated with like reference numerals marked with "primes". In this embodiment, the cutting portions are curved along discrete cutting sections such that edges 2a' and 3a' are curved.

FIG. 5 illustrates a third embodiment in which portions of the cutting tip 1''' which correspond to portions of the first embodiment are indicated with like reference numerals marked with "triple primes". In this embodiment, rather than having the cutting portions formed along upper and lower sections of two diametrically opposite corners of the tip, the cutting portions are formed along each of the upper sections of the four corners of the tip and are formed as straight portions in a manner similar to that shown in FIG. 1A.

FIG. 6 illustrates a fourth embodiment in which portions of the cutting tip 1'''' which correspond to portions of the first embodiment are indicated with like reference numerals marked with "quadruple primes". In this embodiment, the cutting portions are formed along each of the upper portions of the four corners of the tip as in FIG. 5, but are curved around the corners, respectively, as in the embodiment of FIG. 1B.

FIG. 7 illustrates a fifth embodiment in which portions of the cutting tip 1'' which correspond to portions of the first embodiment are marked with "double primes". In this embodiment, the cutting portion is formed continuously about the entire upper periphery of the cutting tip.

Note that, although not shown, the embodiments of FIGS. 5, 6 and 7 can be formed with the cutting portions formed adjacent both the upper and lower surfaces of the cutting tips.

In operation, the first rake surface 2, along with the first edge 2a, effects an efficient cutting operation because of the small absolute value of the first angle θ1 and the running position of the first rake surface 2 that is on the surface side of the piece 4. On the other hand, the second rake surface 3, along with the second edge 3a, running immediately after the first rake surface 2 burnishes the surface of the material 4 after the cutting by the first rake surface 2 and the first edge 2a, though it performs a less efficient cutting operation because of the large absolute value of the second angle θ2 and the running position of the second rake surface 3 that is on the inner side of the piece 4.

To obtain an efficient cutting operation and burnishing operation, it is preferable that the absolute value of the second angle θ2 is from 65° to 85° and that of the first angle θ1 is from 5° (|θ2|−20)°.

Figure 3:
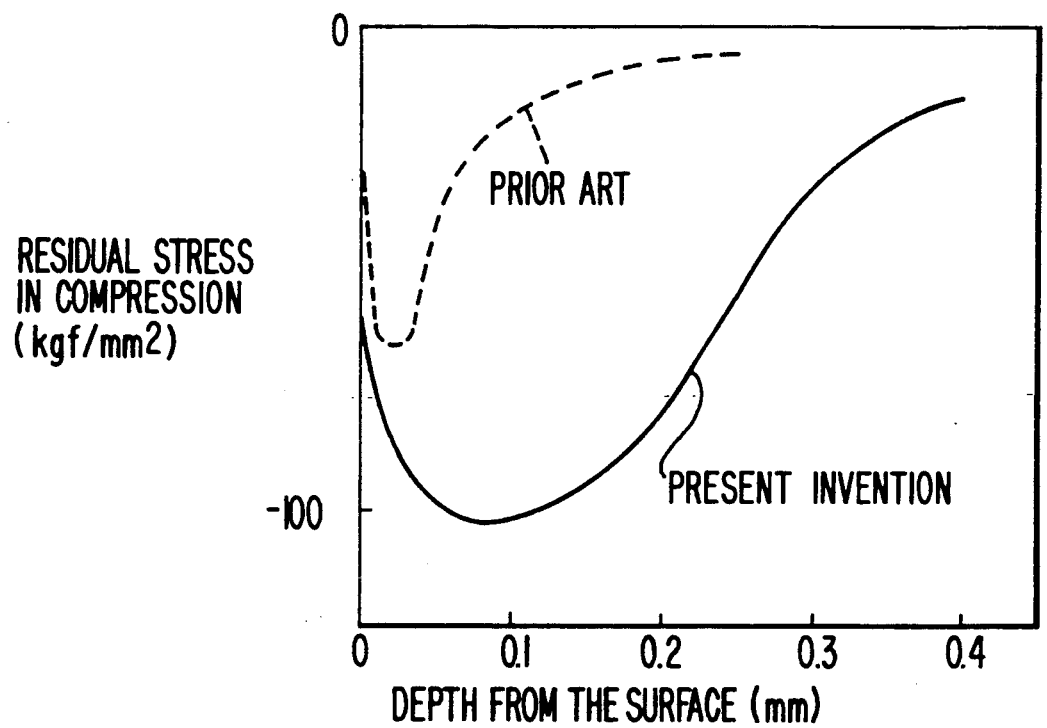
FIG. 3 is a graph showing residual stresses applied to a material by the tip of the above embodiment and a conventional tip with respect to the depth from surface of the material.
Figure 4:
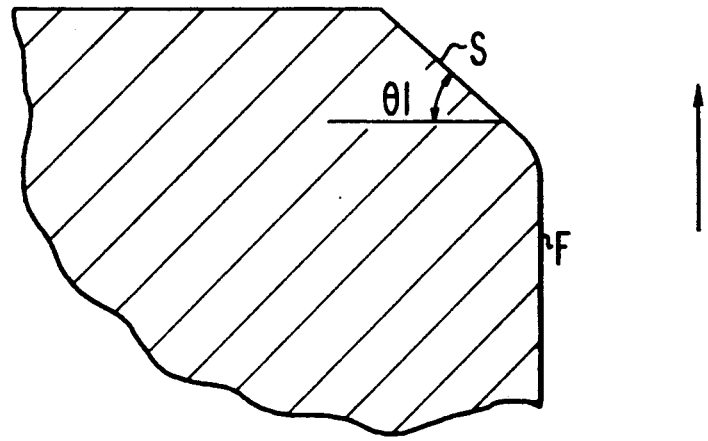
FIG. 4 is a sectional view of an essential part of a cutting edge of the prior art tip.

As obvious from the above description, because the tip can simultaneously perform the cutting operation with the first rake surface 2 and the first edge 2a and the burnishing operation with the second rake surface 3 and the second edge 3a, the tip can give the piece 4 a much heavier residual stress of compression and causes the residual stress of compression to be present even at a greater depth from the surface, as compared with the prior art tip (see FIG. 3). As a result, the material processed by this tip is given much longer life-time against rolling fatigue, as compared with the prior art tip.

The invention being thus described, it will be obvious that the same may be varied in many ways. Such variations are not to be regarded as a departure from the spirit and scope of the invention, and all such modifications as would be obvious to one skilled in the art are intended to be included within the scope of the follow claims.

What is claimed is:

1. A tip for a cutting tool for use in cutting and burnishing a workpiece, having:
   mutually parallel upper and lower quadrilateral faces;
   side walls connecting said upper and lower faces and forming upper and lower peripheral junctions peripherally about the upper and lower faces, respectively;
   a hole formed through said upper and lower surfaces for use in connection of the tip to a cutting tool in such a manner that the upper face is positioned to face a cutting direction, said hole having a longitudinal axis;
   a cutting portion formed along at least a pair of diametrically opposite portions of said upper peripheral junction;
   said cutting portion comprising a first rake surface formed, as viewed in vertical cross section, along a line extending at a first angle with respect to said upper surface, a second rake surface formed, as viewed in vertical cross section, along a line extending at a second angle with respect to said upper surface, a first edge defined by a junction between said first and second rake surfaces, and a second edge defined by a junction between said second rake surface and at least one of said side walls, said first and second angles being defined by different angles, said first and second rake surfaces facing upwardly and radially outwardly with respect to said longitudinal axis and said second rake surface extending along substantially an entire length of said cutting portion;
   wherein said first edge and said first rake surface together define a means for cutting away a predetermined depth of material from the workpiece, and said second edge and said second rake surface together define a means for burnishing the surface of the workpiece cut by said cutting means;
   wherein said first rake surface is located radially inwardly from said second rake surface and said first angle is smaller than said second angle;
   wherein said cutting portion is formed continuously along the entire upper peripheral junction; and
   wherein said upper quadrilateral face and said first rake surface intersect at an edge extending along said upper peripheral junction.

2. A tip for a cutting tool for use in cutting and burnishing a workpiece, having:
   mutually parallel upper and lower quadrilateral faces;
   side walls connecting said upper and lower faces and forming upper and lower peripheral junctions peripherally about said upper and lower faces, respectively;
   a hole formed through said upper and lower surfaces for use in connection of the tip to a cutting tool in such a manner that said upper face is positioned to face a cutting direction, said hole having a longitudinal axis;
   a cutting portion formed along at least a pair of diametrically opposite portions of said upper peripheral junction;
   said cutting portion comprising a first rake surface formed, as viewed in vertical cross section, along a line extending at a first angle with respect to said upper surface, a second rake surface formed, as viewed in vertical cross section, along a line extending at a second angle with respect to said upper surface, a first edge defined by a junction between said first and second rake surfaces, and a second edge defined by a junction between said second rake surface and at least one of said side walls, said first and second angles being defined by different angles, said first and second rake surfaces facing upwardly and radially outwardly with respect to said longitudinal axis and said second rake surface extending along substantially an entire length of said cutting portion;

wherein said first and second edges are formed in parallel with said upper and lower quadrilateral faces;

wherein said first rake surface is located radially inwardly from said second rake surface and said first angle is smaller than said second angle;

wherein said cutting portion is formed continuously along the entire upper peripheral junction; and wherein said upper quadrilateral face and said first rake surface intersect at an edge extending along said upper peripheral junction.

* * * * *